March 12, 1957  E. E. SUMNER  2,785,283
WELDING CIRCUIT
Filed April 23, 1954

INVENTOR
E. E. SUMNER
BY
ATTORNEY

United States Patent Office 2,785,283
Patented Mar. 12, 1957

2,785,283

WELDING CIRCUIT

Eric E. Sumner, New York, N. Y., assignor to Bell Telephone Laboratories, Incorporated, New York, N. Y., a corporation of New York Application April 23, 1954, Serial No. 425,288

10 Claims. (Cl. 219—95)

This invention relates to welding apparatus and more particularly to apparatus for welding metals together percussively.

The advantages of welding by percussive techniques have not been realized fully in practice primarily because the welds produced have not been uniformly of the requisite quality. Variations in the quality of the weld are believed to accrue primarily as the result of the variations in the duration of the arc between the surfaces to be welded. Since it is most difficult to control arc duration, it has been found that satisfactory results can be obtained most feasibly by producing a temperature at the surfaces to be welded which is effectively independent of the duration of the arc.

One object of this invention is to improve the quality of the welds obtained by percussive welding techniques and, more specifically, to improve the uniformity of welds produced by percussive welding apparatus.

A feature of the invention pertains to a means for producing at the surfaces of two metals being welded a substantially constant temperature for a time equal to or in excess of the duration of the arc between those surfaces.

Other objects and features of the invention may be perceived from the following detailed description of an exemplary embodiment of the invention when read with reference to the accompanying drawing in which.

Figure 3:
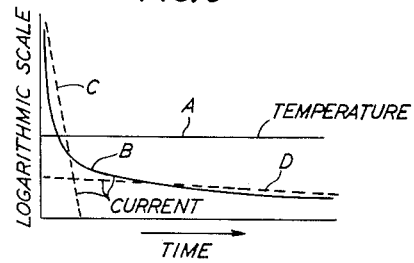
Figure 4:
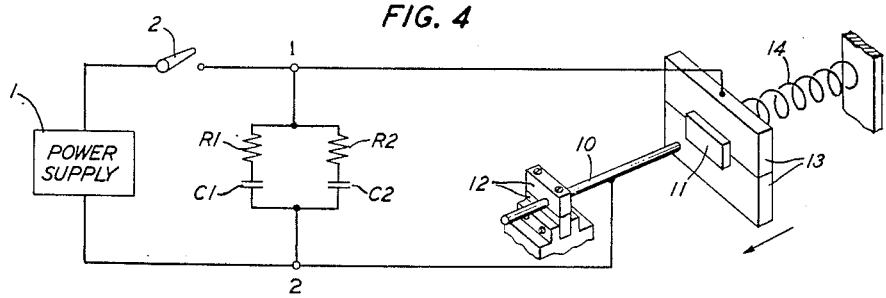

Fig. 3 is a graphic representation of the ideal relationship between time and the temperature at the surfaces to be welded, of the variation, with time, of the current between the surfaces to be welded to produce the aforesaid ideal temperature-time relationship, and of the variation with time, of the welding current when single-section resistance-capacitance networks are employed in the welding circuit in an attempt to approximate the desired current-time relationship;

Fig. 4 is a circuit representing the basic aspects of an improved percussive welding circuit constructed in accordance with the principles of the invention; and Fig. 5 shows other networks, which may be employed in circuits embodying this invention.

Figure 1:
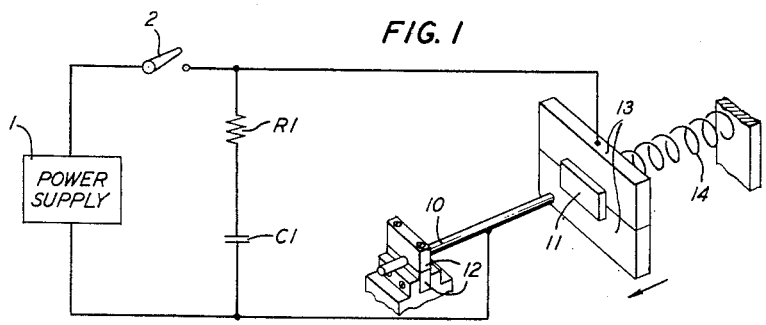
Fig. 1 is a representation of the basic aspects of a conventional percussive welding circuit.

Percussive welding is basically an arc welding technique in which an electrical circuit stores energy and maintains a voltage across the two parts to be welded. This is illustrated in Fig. 1 of the drawings which shows a power supply 1 which is capable of supplying a relatively high value direct voltage. Upon the closure of switch 2, the direct voltage supplied by power supply 1 is applied across capacitor C1 and resistor R1 to charge capacitor C1 to a value approaching that of the supply voltage. Switch 2 may then be opened, with the charge being retained on capacitor C1. The welding is performed by discharging capacitor C1 through resistor R1 and through a load circuit comprising the parts to be welded together. In the exemplary showing of Fig. 1, this load circuit comprises round wire 10 which is to be welded to a small rectangular block 11. One of these parts, such as the wire 10, is held in a fixed position by clamping means 12; the other element, such as the rectangular block 11, is held in jaws 13. Means such as spring 14 is provided for rapidly moving the jaws 13 in a direction to move the rectangular block 11 towards the wire 10. When the rectangular block 11 is separated from the wire 10 by a critical distance, called the arc initiation separation, the air gap between the elements 10 and 11 breaks down and the arc is initiated. The arc heats the opposing surfaces, forming a thin layer of molten metal on both parts. When the molten surfaces ultimately contact one another as a result of the motion of the rectangular block 11, the arc will be extinguished. When the joint cools sufficiently, the weld is completed.

Figure 2:
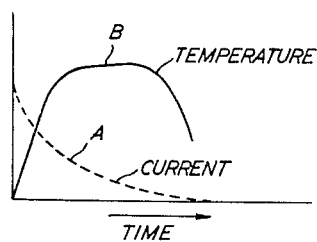
Fig. 2 is a graphic representation of the variation, with time, of the current across the arc and of the temperature of the surfaces being welded when a circuit of the type shown in Fig. 1 is employed.

While percussive welding techniques employing circuits similar to that of Fig. 1 have possessed many advantages for certain types of welding, it has been most difficult to obtain consistently uniform results with such circuits. Referring to Fig. 2 of the drawing, it will be seen that with the current-time relationship, plotted with normal, uniform coordinates as curve A, resulting from discharging a capacitor through a resistive load, the temperature at the surfaces to be welded will vary with time approximately in the fashion represented in curve B of Fig. 2, with that temperature rising relatively slowly to a peak value which is maintained for a limited time and then dropping back towards ambient temperature. With such a temperature-time characteristic, it is clear that the peak temperature attained by those surfaces, the average temperature attained by those surfaces and the temperature at the moment of arc extinction, may be expected to vary as the arc between the elements to be welded varies in duration. Yet, the accurate control of arc duration is exceedingly difficult in a percussive welding process. In accordance with the principles of this invention, the effect of arc duration variation is mitigated by raising the temperature at the surfaces to be welded quickly to the desired temperature and by maintaining those surfaces at that temperature for at least as long as the duration of the longest expected arc. Thus, ideally, the temperature-time relationship is that represented in curve A of Fig. 3 of the drawing, in which the temperature instantaneously rises to an appropriate value and is maintained at that value for whatever time is required for the longest arc to be extinguished. With such a temperature-time characteristic, the nature of the weld will be substantially independent of the arc duration.

It can be demonstrated that a temperature-time relationship of the nature of that represented in curve A of Fig. 3 can be obtained by the use of a circuit producing a current versus time relationship expressed by the formula $$i = \frac{2KAT}{V\sqrt{a^2 \pi t}}$$

where,

*i* is the instantaneous current in amperes.

K is the thermal conductivity of the material in watts per centimeter degree centigrade.

A is the cross-sectional area over which heat flow occurs in square centimeters.

T is the desired temperature rise at the surface in degrees centigrade.

V is the voltage across the arc in volts.

$a^2$ is the diffusivity factor of the material in square centimeters per second.

*t* is the time in seconds.

For any given materials and geometry the expression $$\frac{-2KA}{V\sqrt{a^2\pi}}$$

may be equated to a constant $k$, reducing the equation $$i = \frac{2KAT}{V\sqrt{a^2\pi t}}$$

to $$i = \frac{kT}{\sqrt{t}}$$

For any desired temperature, therefore, the instantaneous charging current should, ideally, be an inverse function of the square root of the elapsed time.

The current-time relationship represented by the foregoing equation is in the nature of one due to a capacitive transmission line working into a short circuit, the load seen by the line being essentially of zero impedance since the arc voltage is much smaller than the voltage to which the line is charged.

The ideal current-time relationship appears as curve B of Fig. 3 if it be plotted to a semi-log scale, i. e., if the abscissa be uniformly divided and the ordinate be logarithmically divided. Plotted with similar coordinates, the current-time relationship resulting from a single resistance-capacitance circuit is represented by a straight line, since, as is well known with such a circuit, the transient or instantaneous current is a direct function of $$\epsilon^{-\frac{t}{RC}}$$

Consequently, the parameters of a single resistance-capacitance circuit may be selected to produce a current-time relationship approximating the initial portion of the curve B of Fig. 3, approximating the terminating portion of curve B, or approximating any other single portion of curve B by virtue of being tangential thereto. The first of these curves is plotted as curve C of Fig. 3 and the second is plotted as curve D. If the parameters be selected to produce current-time relationship of the nature represented by curve C of Fig. 3, the temperature will rise rapidly to an appropriate value but will fail to continue sufficiently long to encompass the range of arc duration variations; if the parameters of the resistance-capacitance circuits are selected to produce a current-time relationship of the nature represented by curve D of Fig. 3, the temperature will not rise to an appropriate value with the desired rapidity. In the first case long arc durations will produce unsatisfactory welds due to the fact that the temperature is inadequately high during the final portion of the arc; in the second case short arc duration will produce unsatisfactory welds since the temperature at the surfaces will be inadequately high during the initial portions of the arc.

It may not be practicable in all cases to use a distributed constant capacitative line having a current-time relationship represented by the foregoing equation and by curve B of Fig. 3. Such a line can, however, be approximated to a close degree of accuracy by, for example, means of a plurality of parallel connected networks, each of said networks comprising a serially interconnected resistor and capacitor. As few as two such networks have been found to provide sufficiently constant temperature conditions at the welding surfaces to produce consistently good welds. Such a system is represented in Fig. 4 of the drawing, which is similar in nature and operation to the circuit of Fig. 1 except for the addition of capacitor C2 and resistor R2. The time constant of the two resistance-capacitance networks will, of course, be appropriately selected. Excellent results have been obtained in practice by employing networks having time constants which differ from one another by a factor in the order of 10 to 15 times. For example, capacitor C1 may be in the order of 80 microfarads, resistor R1 may be in the order of .75 ohm, capacitor C2 may be in the order of 100 microfarads and resistor R2 may be in the order of 7½ ohms. The power supply should preferably be capable of producing a direct voltage in the order of one to two kilovolts.

Figure 5A:
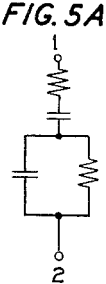
Figure 5B:
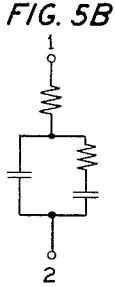
Figure 5C:
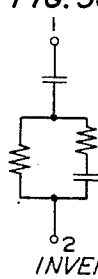

Those skilled in the art will recognize that the network between terminals 1 and 2 of Fig. 4 has certain equivalents which may be employed in lieu of said network with no appreciable difference in result. The three networks which are the equivalents of the network of Fig. 4 are represented in Figs. 5A, 5B and 5C.

Those skilled in the art will also recognize that the four networks of Figs. 4 and 5 may be uniquely defined, as a group, by specifying the zeros and poles thereof; given the zeros and poles, one skilled in the art can derive the networks of Figs. 4 and 5.

The zeros and poles of the networks of Figs. 4 and 5 can be derived, in the manner well known in the art, as follows, using the network of Fig. 4 as an example:

The impedance of the branch comprising resistor R1 and capacitor C1 is $$R_1 + \frac{1}{PC_1}$$

where P is the conventional complex frequency variable. Similarly, the impedance of the branch comprising resistor R2 and capacitor C2 is $$R_2 + \frac{1}{PC_2}$$

The total impedance may be expressed by the formula:

$$\left(\frac{R_1 R_2}{R_1 + R_2}\right) \frac{\left(P + \frac{1}{R_1 C_1}\right)\left(P + \frac{1}{R_2 C_2}\right)}{P\left[P + \frac{C_1 + C_2}{C_1 C_2 (R_1 + R_2)}\right]}$$

From this expression it may be observed that the absolute impedance value will be zero whenever P is equal to the negative reciprocal of either $R_1 C_1$ or $R_2 C_2$, and that the absolute impedance value will be infinite whenever P is equal to either zero or to $$-\frac{C_1 + C_2}{C_1 C_2 (R_1 + R_2)}$$

Consequently, the networks of Figs. 4 and 5 are uniquely defined by stating that they have zeros at $$P = -\frac{1}{R_1 C_1} \text{ and at } P = -\frac{1}{R_2 C_2}$$

and that they have poles at $P = 0$ and at $$P = -\frac{C_1 + C_2}{C_1 C_2 (R_1 R_2)}$$

While but two resistance-capacitance networks are shown in Fig. 4, it is to be recognized that, theoretically, the greater the number of such networks which are connected in parallel, the more closely may the theoretically desired result of constant welding temperature be approached. An infinite number of such networks would theoretically produce the ideal current-time relationship. It will further be recognized that each such network will have a plurality of equivalents of the type of those shown in Fig. 5.

It is to be understood that the above-described arrangements are but illustrative of the application of the principles of the invention. Numerous other arrangements may be divided by those skilled in the art without departing from the spirit and scope of the invention.

What is claimed is:

1. In a welding system, a network comprising a plurality of resistors and a plurality of capacitors in which the effective time constant of the network is a function of two or more products of resistance and capacitance, these products being unequal, means for charging said capacitors, a welding load comprising two electrodes, and concurrently effective discharge paths for said capacitors through said resistors and said two electrodes.

2. In a welding system, a network comprising a plurality of resistors and a plurality of capacitors, one from each of which is permutatively combined with one from each of the other in a series-parallel relationship, means for charging said capacitors, a welding load comprising two electrodes, and concurrently effective discharge paths for said capacitors through said resistive elements and said two electrodes.

3. In a welding system, a network comprising two resistors $R_1$ and $R_2$ and two capacitors $C_1$ and $C_2$, means for charging said capacitors, a welding load comprising two electrodes, and concurrently effective discharge paths for said capacitors through said resistors and said two electrodes, said network having zeroes at $$P = -\frac{1}{R_1 C_1} \text{ and } P = -\frac{1}{R_2 C_2}$$

and poles at $P=0$ and $$P = -\frac{C_1 + C_2}{C_1 C_2 (R_1 R_2)}$$

where P is the complex frequency variable, $R_1$ and $R_2$ are the values of said two resistors, respectively, and $C_1$ and $C_2$ are the values of said two capacitors, respectively.

4. In a welding system, a first network comprising a first capacitor connected in series with a first resistor, a second network connected in parallel with the said first network and comprising a second capacitor connected in series with a second resistor, means for charging said capacitors, a welding load circuit, a discharge path for said first capacitor including said load circuit and said first resistor, a discharge path for said second capacitor including said load circuit and said second resistor, and means for concurrently establishing said discharge paths.

5. In a welding system, two normally spaced apart objects to be welded together, a plurality of networks connected in parallel, each of said networks comprising a capacitor serially connected to a resistor, means for charging said capacitors, and means for discharging said capacitors through said resistors and said objects, said last-mentioned means including means for moving one of said objects towards the other of said objects, thereby to establish an arc discharge between said objects.

6. In a welding system, two normally spaced apart objects to be welded together, a plurality of networks connected in parallel, each of said networks comprising a capacitor serially connected to a resistor, means for charging said capacitors, and means for discharging said capacitors through said resistors and said objects, said last-mentioned means including means for moving one of said objects towards the other of said objects to establish an arc discharge therebetween, said resistors and capacitors being of such value as to provide a substantially constant temperature at the welding surfaces of said objects during said arc discharge.

7. In a welding system, two normally spaced apart objects to be welded together, a plurality of networks connected in parallel, each of said networks comprising a capacitor serially connected to a resistor, means for charging said capacitors, and means for discharging said capacitors through said resistors and said objects, said last-mentioned means including other means for moving one of said objects towards the other of said objects to establish an arc discharge therebetween, said resistors and capacitors being of such value as to cause the instantaneous discharge current to vary substantially as an inverse function of the square root of the discharge time.

8. A welding circuit comprising two objects to be welded, a plurality of charged capacitors of different values bridged thereacross and dischargeable therethrough, and means for limiting the intensity of the discharge from said capacitors to produce a substantially constant temperature at the welding surfaces of said two objects for the duration of said discharge.

9. A welding circuit comprising two objects to be welded, means for moving one of said objects towards the other of said objects, a plurality of networks, each of said networks comprising a charged capacitor and a current limiting device, each of said networks being bridged across said two objects and dischargeable to produce a welding current therethrough, the values of the capacitors and current limiting devices in all said networks being computed to produce a welding current yielding a substantially constant temperature at the welding surfaces of said two objects for a predetermined duration.

10. A welding circuit comprising two objects to be welded, a source of stored electrical energy connected thereto and dischargeable therethrough, and means for limiting the intensity of the discharge from said source of stored electrical energy to produce a substantially constant temperature at the welding surfaces of said two objects for the duration of the welding period.

References Cited in the file of this patent

UNITED STATES PATENTS

| | | |
|---|---|---|
| 1,806,121 | Siebs | May 19, 1931 |
| 1,833,660 | Siebs et al. | Nov. 24, 1931 |
| 2,359,178 | White | Sept. 26, 1944 |

FOREIGN PATENTS

| | | |
|---|---|---|
| 460,141 | Canada | Oct. 4, 1949 |
| 519,353 | Great Britain | Mar. 21, 1940 |
| 779,350 | France | Jan. 14, 1935 |